US011452360B1

(12) United States Patent
Cedeno, Sr.

(10) Patent No.: US 11,452,360 B1
(45) Date of Patent: Sep. 27, 2022

(54) BACKPACK WITH INFLATABLE CUSHIONS

(71) Applicant: Qwasahn A. Cedeno, Sr., Philadelphia, PA (US)

(72) Inventor: Qwasahn A. Cedeno, Sr., Philadelphia, PA (US)

(*) Notice: Subject to any disclaimer, the term of this patent is extended or adjusted under 35 U.S.C. 154(b) by 0 days.

(21) Appl. No.: 17/480,209

(22) Filed: Sep. 21, 2021

(51) Int. Cl.
*A45F 3/04* (2006.01)
*A45F 3/12* (2006.01)
*A45C 13/10* (2006.01)
*A45C 13/02* (2006.01)
*A45C 11/00* (2006.01)
*G06F 1/18* (2006.01)
*H02J 7/00* (2006.01)

(52) U.S. Cl.
CPC ............. *A45F 3/04* (2013.01); *A45C 11/00* (2013.01); *A45C 13/02* (2013.01); *A45C 13/103* (2013.01); *A45F 3/12* (2013.01); *G06F 1/189* (2013.01); *A45C 2011/003* (2013.01); *A45F 2003/122* (2013.01); *A45F 2003/127* (2013.01); *A45F 2200/0525* (2013.01); *H02J 7/0042* (2013.01)

(58) Field of Classification Search
CPC ........ A45F 3/04; A45F 3/12; A45F 2003/122; A45F 2003/127
USPC ...................................................... 224/643
See application file for complete search history.

(56) References Cited

U.S. PATENT DOCUMENTS

| | | | | |
|---|---|---|---|---|
| 3,883,053 A * | 5/1975 | Pritchard | ............... | A45F 3/12 297/483 |
| 5,031,246 A * | 7/1991 | Kronenberger | .......... | A42B 1/22 2/418 |
| 5,205,814 A * | 4/1993 | Lundrigan | ............... | A61F 5/34 128/DIG. 20 |
| 5,957,356 A * | 9/1999 | Potempa | .............. | A45C 7/0081 224/264 |
| D423,782 S * | 5/2000 | Ammerman | ................... | D3/327 |
| 6,109,495 A * | 8/2000 | Hernandez | ................ | A45F 3/04 224/264 |
| 6,168,056 B1 * | 1/2001 | Bertholon | .............. | A45C 13/30 224/264 |
| 6,471,105 B1 * | 10/2002 | Ammerman | .............. | A45F 3/12 224/264 |
| 6,626,341 B2 * | 9/2003 | Mitchell | ................... | A45F 3/04 224/644 |
| 6,793,112 B2 * | 9/2004 | Ammerman | .............. | A45F 3/02 224/264 |
| 6,863,202 B2 * | 3/2005 | Ammerman | .............. | A45F 3/12 224/264 |

(Continued)

*Primary Examiner* — Justin M Larson
(74) *Attorney, Agent, or Firm* — Kyle A. Fletcher, Esq.

(57) ABSTRACT

The backpack with inflatable cushions comprises a backpack, inflatable shoulder pads, and an inflatable lumbar support. The backpack may be adapted to be worn on a user's back, supported by a pair of shoulder straps, and may be operable to carry items within the backpack. Non-limiting examples of the items that may be carried within the backpack comprise school supplies, camping gear, sports equipment, and a change of clothing. The inflatable shoulder pads may be adapted to distribute the weight of the pair of shoulder straps over a larger area of a user's shoulders when the inflatable shoulder pads are inflated with air. The inflatable lumbar support may be adapted to fill the space between a user's lower back and the bottom of the backpack when inflated, thus promoting good posture and reducing back pain.

19 Claims, 5 Drawing Sheets

(56) References Cited

U.S. PATENT DOCUMENTS

| | | | |
|---|---|---|---|
| 6,915,932 B1* | 7/2005 | Wolfe | A45F 3/12 224/264 |
| 7,631,792 B2* | 12/2009 | Christy | A45F 3/04 224/644 |
| 7,717,310 B2* | 5/2010 | Zalinsky | A45F 3/12 224/644 |
| 8,215,526 B2* | 7/2012 | Zalinsky | A45F 3/12 224/907 |
| 8,240,531 B2 | 8/2012 | Lam | |
| 9,425,632 B2 | 8/2016 | Pickens | |
| 9,862,443 B2 | 1/2018 | White, Jr. | |
| 2002/0189003 A1* | 12/2002 | Babcock | A45F 3/14 2/268 |
| 2005/0205634 A1* | 9/2005 | Han | A45F 3/12 224/644 |
| 2006/0040574 A1* | 2/2006 | O'Meara | B63C 9/1255 441/88 |
| 2006/0175367 A1* | 8/2006 | Khorshid | A45F 3/042 224/264 |
| 2006/0226192 A1* | 10/2006 | Christy | A45F 3/04 224/644 |
| 2007/0215662 A1* | 9/2007 | Zalinsky | A45F 3/12 224/644 |
| 2009/0249700 A1 | 10/2009 | Peterson | |
| 2011/0120893 A1 | 5/2011 | Rekue et al. | |
| 2012/0085804 A1* | 4/2012 | Christy | A45C 13/02 224/644 |
| 2016/0213128 A1* | 7/2016 | Maxfield | A45F 3/10 |
| 2019/0133304 A1 | 5/2019 | Shir | |
| 2021/0106126 A1 | 4/2021 | Gantz | |

* cited by examiner

BACKPACK WITH INFLATABLE CUSHIONS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of backpacks, more specifically, a backpack with inflatable cushions.

SUMMARY OF INVENTION

The backpack with inflatable cushions comprises a backpack, inflatable shoulder pads, and an inflatable lumbar support. The backpack may be adapted to be worn on a user's back, supported by a pair of shoulder straps, and may be operable to carry items within the backpack. Non-limiting examples of the items that may be carried within the backpack comprise school supplies, camping gear, sports equipment, and a change of clothing. The inflatable shoulder pads may be adapted to distribute the weight of the pair of shoulder straps over a larger area of a user's shoulders when the inflatable shoulder pads are inflated with air. The inflatable lumbar support may be adapted to fill the space between a user's lower back and the bottom of the backpack when inflated, thus promoting good posture and reducing back pain.

An object of the invention is to provide a backpack for carrying items on a user's back, supported by shoulder straps.

Another object of the invention is to provide inflatable shoulder pads that may be inflated or deflated to adjust the comfort level of the backpack pressing down on the user's shoulders.

A further object of the invention is to provide an inflatable lumbar support that may be inflated or deflated to adjust the comfort level of the backpack pressing against the user's lower back.

Yet another object of the invention is to provide one or more exterior pockets for carrying items that may need to be access quickly.

These together with additional objects, features and advantages of the backpack with inflatable cushions will be readily apparent to those of ordinary skill in the art upon reading the following detailed description of the presently preferred, but nonetheless illustrative, embodiments when taken in conjunction with the accompanying drawings.

In this respect, before explaining the current embodiments of the backpack with inflatable cushions in detail, it is to be understood that the backpack with inflatable cushions is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the backpack with inflatable cushions.

It is therefore important that the claims be regarded as including such equivalent construction insofar as they do not depart from the spirit and scope of the backpack with inflatable cushions. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The backpack with inflatable cushions 100 (hereinafter invention) comprises a backpack 200, inflatable shoulder pads 248, and an inflatable lumbar support 270. The backpack 200 may be adapted to be worn on a user's back, supported by a pair of shoulder straps, and may be operable to carry items within the backpack 200. Non-limiting examples of the items that may be carried within the backpack 200 comprise school supplies, camping gear, sports equipment, and a change of clothing. The inflatable shoulder pads 248 may be adapted to distribute the weight of the pair of shoulder straps over a larger area of a user's shoulders when the inflatable shoulder pads 248 are inflated with air. The inflatable lumbar support 270 may be adapted to fill the space between a user's lower back and the bottom of the backpack 200 when inflated, thus promoting good posture and reducing back pain.

Throughout this document, "rear" may refer to the side of the backpack 200 that presses against the user's back and "front" may refer to the side of the backpack 200 that would be observed by a person standing behind a user while the user wears the backpack 200. "Left" may refer to the side of the backpack 200 that is located on the user's left side and "right" may refer to the side of the backpack 200 that is located on the user's right side.

The backpack 200 may be a frameless, fabric sack. As non-limiting examples, the backpack 200 may be made of nylon, canvas, cotton, polyester, polypropylene, or combinations thereof. In a preferred embodiment, the backpack 200 may be made of 400 denier ripstop nylon. In some embodiments, the backpack 200 may be water resistant.

The backpack 200 may comprise one or more storage compartments that may be located within the backpack 200. An individual storage compartment 212 selected from the one or more storage compartments may be accessible from outside of the backpack 200 via a zippered opening 214.

The backpack 200 may comprise a foam body 220. The foam body 220 may be a foam armature coupled to the exterior of the backpack 200. The foam body 220 may be adapted to strengthen the backpack 200 and to improve the appearance of the backpack 200. In a preferred embodiment, the foam body 220 may be shaped ethylene-vinyl acetate foam molded onto the backpack 200.

The pair of shoulder straps may be coupled to the backpack 200 to suspend the backpack 200 from the user's shoulders. The pair of shoulder straps may comprise a left shoulder strap 230 that may pass over a user's left shoulder and a right shoulder strap 232 that may pass over a user's right shoulder. The left shoulder strap 230 may be coupled to the backpack 200 at the top left rear of the backpack 200 and at the bottom left rear of the backpack 200. The right shoulder strap 232 may be coupled to the backpack 200 at the top right rear of the backpack 200 and at the bottom right rear of the backpack 200.

In some embodiments, the backpack 200 may comprise one or more exterior storage pockets 240. As non-limiting examples, the one or more exterior storage pockets 240 may be adapted to hold a water bottle, handheld GPS, rain poncho, umbrella, hiking snacks, or sunscreen.

In some embodiments, the backpack 200 may comprise a hanger loop 242. The hanger loop 242 may be adapted to suspend the backpack 200 from a hook when the backpack 200 is not being worn.

The inflatable shoulder pads 248 may cushion the user's shoulders by distributing the weight of the backpack 200 over an expanded area when the inflatable shoulder pads 248 are inflated. An individual inflatable shoulder pad 250 selected from the inflatable shoulder pads 248 may surround the upper end of an individual shoulder strap 234 selected from the pair of shoulder straps.

The individual inflatable shoulder pad 250 may comprise an open cell foam liner 252, a shoulder air bladder 254, a flexible covering 256, and a shoulder air pump 258. The open cell foam liner 252 may be a cushioning pad that surrounds the individual shoulder strap 234. The open cell foam liner 252 may distribute the weight of the backpack 200 over the footprint of the individual inflatable shoulder pad 250 and may protect the individual shoulder strap 234 from damage.

The shoulder air bladder 254 may surround the individual inflatable shoulder pad 250. The shoulder air bladder 254 may expand when inflated thus distributing the weight of the backpack 200 over an even larger footprint. The shoulder air bladder 254 may also act as a shock-absorber by dampening kinetic impulses as the user moves while wearing the backpack 200.

The flexible covering 256 may surround the shoulder air bladder 254 to protect the shoulder air bladder 254 from abrasion and other damage.

The shoulder air pump 258 may inflate and deflate the shoulder air bladder 254. The shoulder air pump 258 may be adapted to pump air into the shoulder air bladder 254 when the user performs an inflation action to the shoulder air pump 258. The shoulder air pump 258 may be adapted to release air from the shoulder air bladder 254 when the user performs a deflation action to the shoulder air pump 258. The shoulder air pump 258 would ideally be able to turn or rotate the knob in order to enable the compressed air to escape the shoulder air bladder 254.

The individual inflatable shoulder pad 250 may comprise one or more exterior foam pads 260. The one or more exterior foam pads 260 may be coupled to an inside surface 262 of the individual inflatable shoulder pad 250. The one or more exterior foam pads 260 may be adapted to increase comfort by providing additional cushioning and may enhance the appearance of the invention 100.

The inflatable lumbar support 270 may comprise an open cell foam pad 272, a lumbar air bladder 274, and a lumbar air pump 276. The open cell foam pad 272 may be a cushioning pad that extends laterally across the bottom rear of the backpack 200. The open cell foam liner 252 may distribute the weight of the backpack 200 over the footprint of the open cell foam pad 272.

The lumbar air bladder 274 may surround the open cell foam pad 272. The lumbar air bladder 274 may expand when inflated thus distributing the weight of the backpack 200 over an even larger footprint. The lumbar air bladder 274 may also act as a shock-absorber by dampening kinetic impulses as the user moves while wearing the backpack 200.

The lumbar air pump 276 may inflate and deflate the lumbar air bladder 274. The lumbar air pump 276 may be adapted to pump air into the lumbar air bladder 274 when the user performs the inflation action to the lumbar air pump 276. The lumbar air pump 276 may be adapted to release air from the lumbar air bladder 274 when the user performs the deflation action to the lumbar air pump 276.

In some embodiments, the backpack 200 may comprise a lumbar support pouch 278 to hold the open cell foam pad 272 and the lumbar air bladder 274. The lumbar support pouch 278 may be a rearward extension of the bottom rear of the backpack 200 that may be adapted to place the lumbar air bladder 274 closer to the user's lower back.

An individual air pump selected from the shoulder air pumps 258 and the lumbar air pump 276 may be associated with an individual air bladder selected from the shoulder air bladders 254 and the lumbar air bladder 274 by virtue of the fact that the individual air pump may inflate and/or deflate the individual air bladder. The individual air pump may inflate the individual air bladder when the user performs the inflation action. The individual air pump may deflate the individual air bladder when the user performs the deflation action. As non-limiting examples, the inflation action may comprise repeatedly pressing a pump activator 268 of the individual air pump. As non-limiting examples, the deflation action may comprise pressing and holding the pump activator 268 of the individual air pump or twisting the pump activator 268 of the individual air pump.

Figure 1:
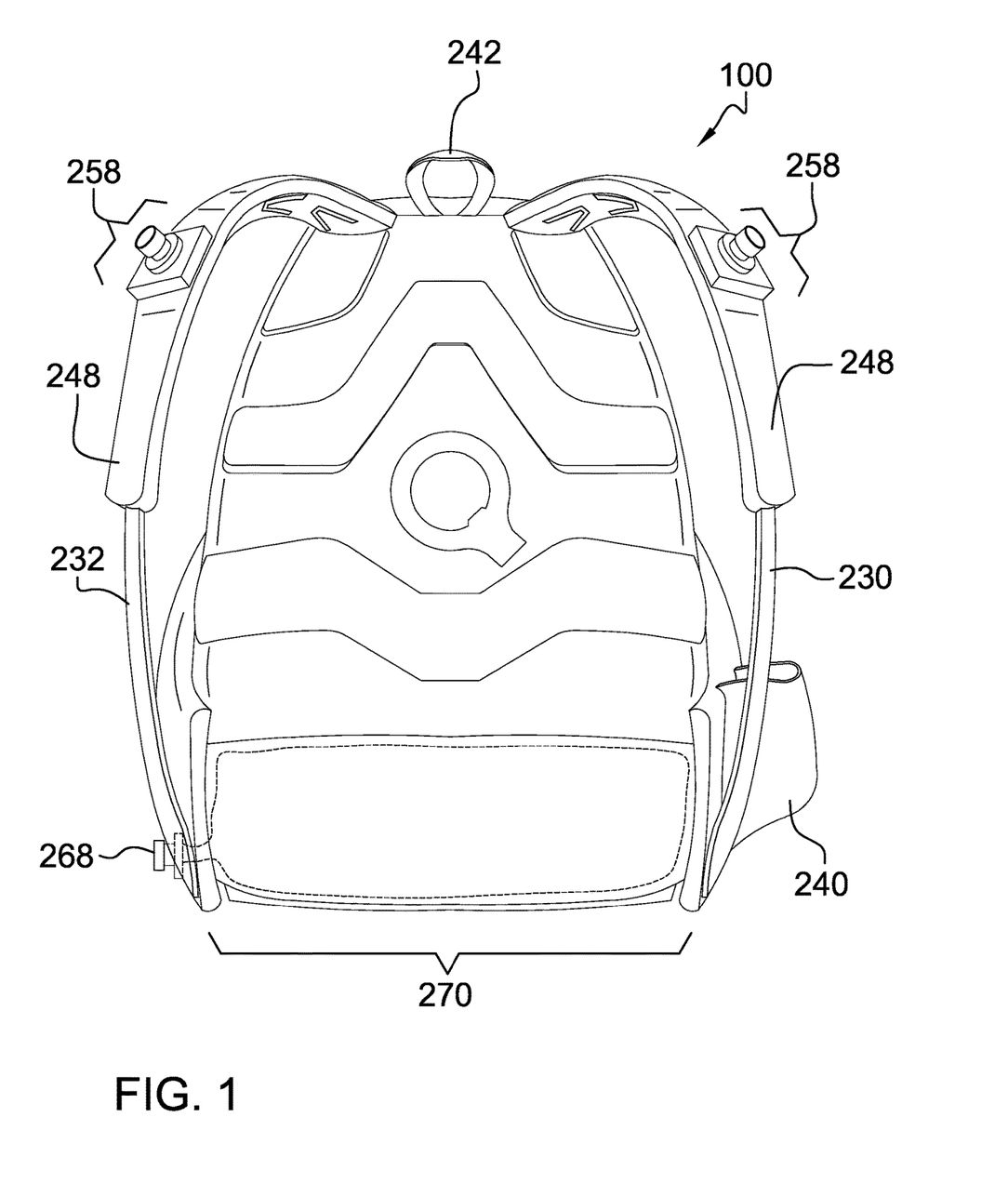
FIG. 1 is a front view of an embodiment of the disclosure.
Figure 2:
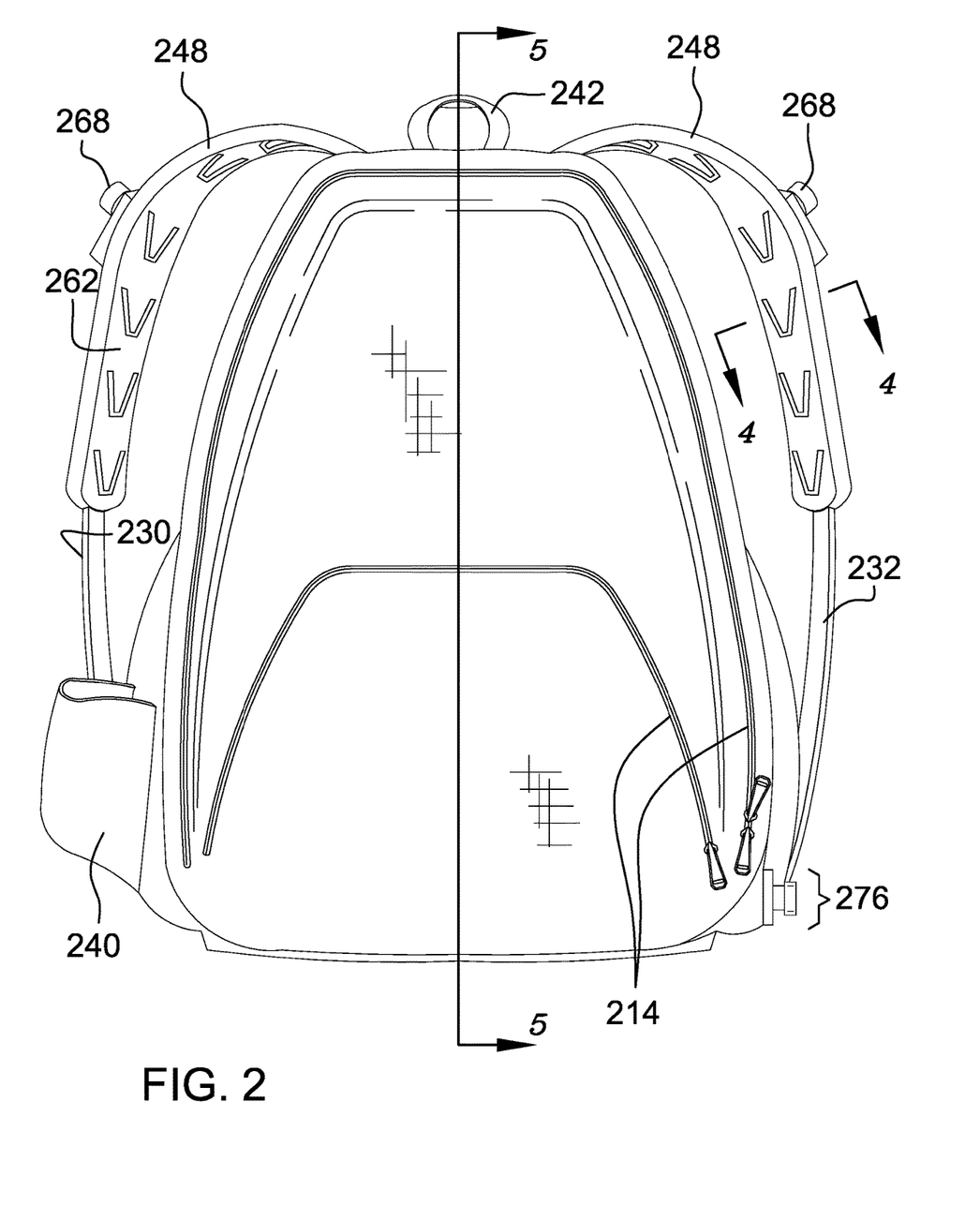
FIG. 2 is a rear view of an embodiment of the disclosure.
Figure 3:
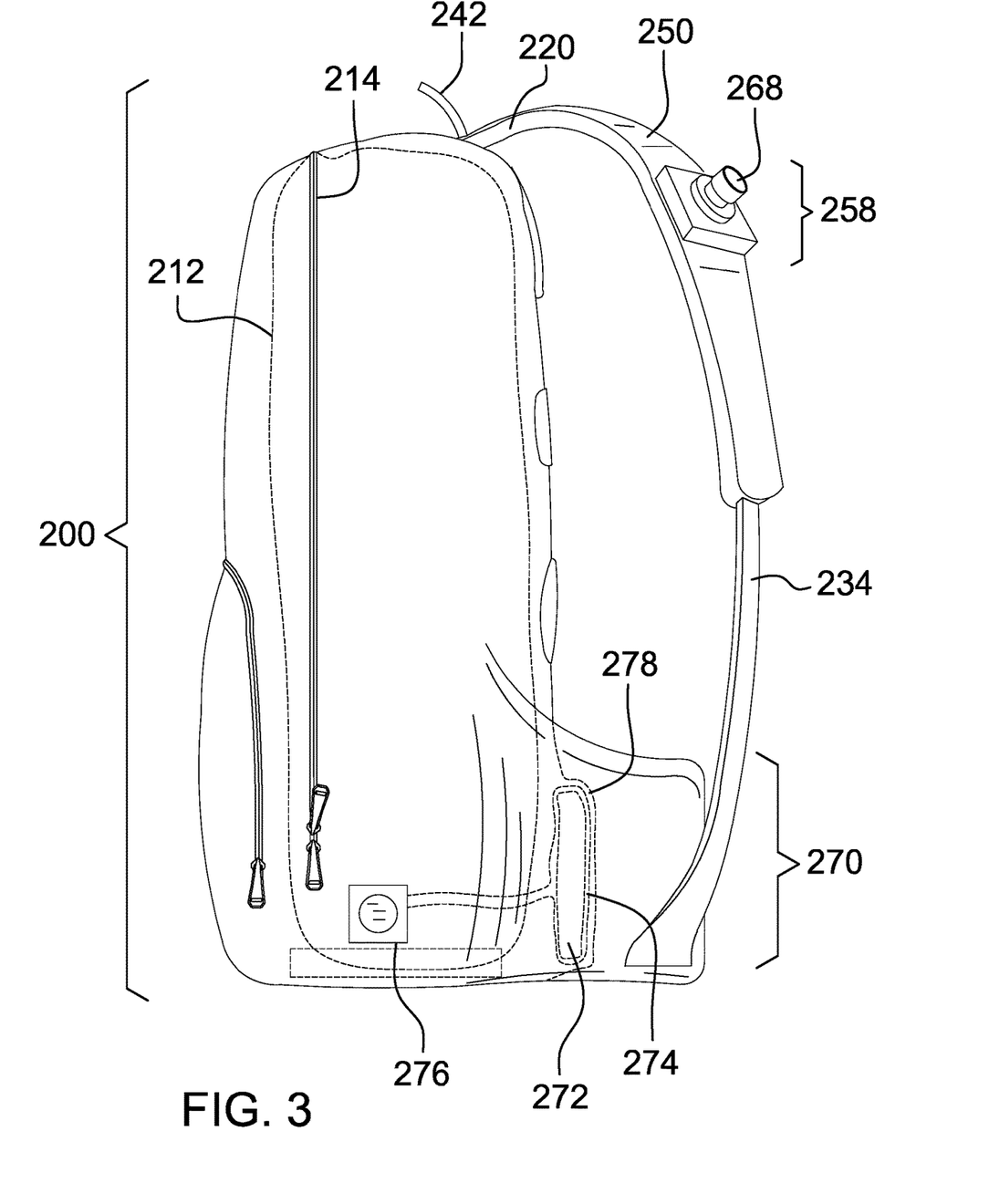
FIG. 3 is a side view of an embodiment of the disclosure.
Figure 4:
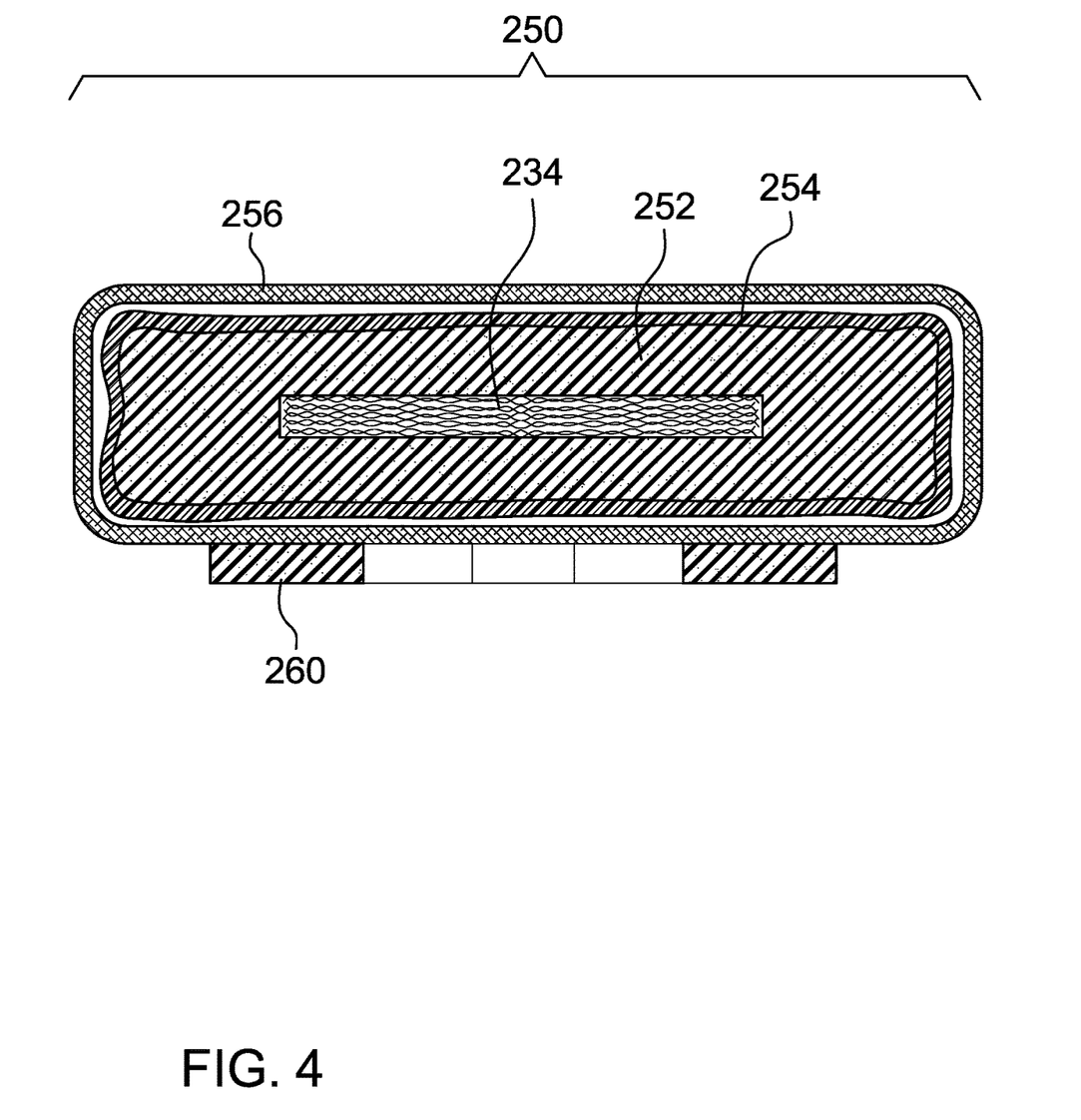
FIG. 4 is a cross-sectional view of an embodiment of the disclosure across 4-4 as shown in FIG. 2.
Figure 5:
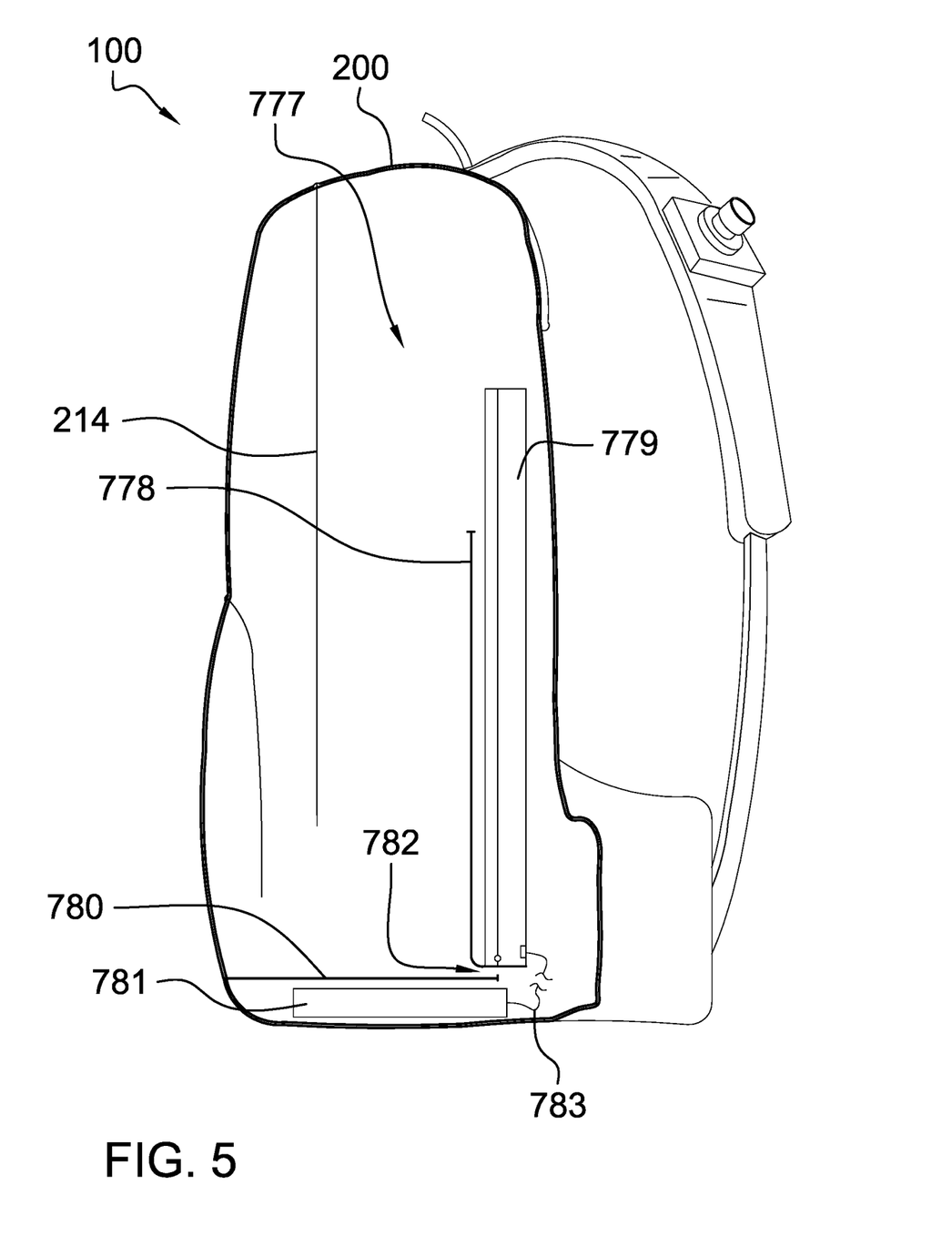
FIG. 5 is a cross-sectional view of the embodiment of the disclosure across 5-5 as shown in FIG. 2.

Referring to FIG. 5, an interior compartment 777 of the backpack 200 is accessible via one of the zippered openings 214. Moreover, the interior compartment 777 includes a laptop sleeve 778. The laptop sleeve 778 is provided to support and store a laptop computer 779 inside of the backpack 200. Moreover, the interior compartment 777 of the backpack 200 houses a charging module compartment 780. The charging module compartment 780 houses a charging pad 781 therein. The charging pad 781 is well known in the art of laptop accessories that provide a wireless battery pack that is used to recharge the laptop computer 779 when on the go. Moreover, the charging module compartment 780 provides a wire opening 782 to enable egress of a wire 783 to extend from the laptop computer 779 to the charging pad 781.

In use, the user may place items into the one or more storage compartments and may close the zippered openings 214 using zippers. The user may don the backpack 200 by placing their arms though the pair of shoulder straps and moving the backpack 200 into position against the user's back. The user may perform the inflation action and/or the deflation action on the shoulder air pumps 258 to adjust the comfort level of the inflatable shoulder pads 248. The user may perform the inflation action and/or the deflation action on the lumbar air pump 276 to adjust the comfort level of the inflatable lumbar support 270.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, the words "couple", "couples", "coupled" or "coupling", may refer to connecting, either directly or indirectly, and does not necessarily imply a mechanical connection.

As used herein, "denier" may refer to a unit of linear mass density for a fiber that is calculated as grams per 9000 meters. The standard reference is silk—a 9000 meter strand of silk weighs approximately one gram therefore silk is approximately one denier.

As used in this disclosure, the word "exterior" may be used as a relational term that implies that an object is not located or contained within the boundary of a structure or a space.

As used in this disclosure, "flexible" may refer to an object or material which will deform when a force is applied to it, which will not return to its original shape when the deforming force is removed, and which may not retain the deformed shape caused by the deforming force.

As used here, "footprint" may refer to a projection of an object onto the surface that supports the object. The projection is usually, but not always, vertically downward.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, the word "lateral" may refer to the sides of an object or movement towards a side. Lateral directions are generally perpendicular to longitudinal directions. "Laterally" may refer to movement in a lateral direction.

As used in this disclosure, the "lumbar" may refer to the lower back region of a person. Lumbar may refer to the lower spine and/or to the region proximal to the lower spine.

As used herein, "open cell foam" may refer to a material formed by trapping pockets of gas within the material. Foam is generally classified as open cell when more than one half of the cells formed in the rubber are open. Non-limiting examples of open cell foam comprise reticulated foam, polyurethane foam, and open cell rubber.

As used herein, "water resistant" may refer to an object that is not harmed by incidental exposure to water but may be harmed if totally submerged. As non-limiting examples, incidental exposure to water may include exposure to raindrops, dew, and splashes from puddles.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A backpack with inflatable cushions comprising:
a backpack, inflatable shoulder pads, and an inflatable lumbar support;
wherein the backpack is adapted to be worn on a user's back, supported by a pair of shoulder straps, and is operable to carry items within the backpack;
wherein the inflatable shoulder pads are adapted to distribute the weight of the pair of shoulder straps over a larger area of a user's shoulders when the inflatable shoulder pads are inflated with air;
wherein the inflatable lumbar support is adapted to fill the space between a user's lower back and the bottom of the backpack when inflated, thus promoting good posture and reducing back pain; wherein each
inflatable shoulder pad comprises an open cell foam liner, a shoulder air bladder, a flexible covering, and a shoulder air pump;
wherein the open cell foam liner is a cushioning pad that surrounds the individual shoulder strap;
wherein the open cell foam liner distributes the weight of the backpack over the footprint of the individual inflatable shoulder pad and protects the individual shoulder strap from damage.

2. The backpack with inflatable cushions according to claim 1
wherein the backpack is a frameless, fabric sack.

3. The backpack with inflatable cushions according to claim 2
wherein the backpack is water resistant.

4. The backpack with inflatable cushions according to claim 2
- wherein the backpack comprises one or more storage compartments that are located within the backpack;
- wherein an individual storage compartment selected from the one or more storage compartments is accessible from outside of the backpack via a zippered opening.

5. The backpack with inflatable cushions according to claim 4
- wherein the backpack comprises a foam body;
- wherein the foam body is a foam armature coupled to the exterior of the backpack;
- wherein the foam body is adapted to strengthen the backpack and to improve the appearance of the backpack.

6. The backpack with inflatable cushions according to claim 5
- wherein the foam body is shaped ethylene-vinyl acetate foam molded onto the backpack.

7. The backpack with inflatable cushions according to claim 5
- wherein the pair of shoulder straps are coupled to the backpack to suspend the backpack;
- wherein the pair of shoulder straps comprises a left shoulder strap that is adapted to pass over a user's left shoulder and a right shoulder strap that is adapted to pass over a user's right shoulder;
- wherein the left shoulder strap is coupled to the backpack at the top left rear of the backpack and at the bottom left rear of the backpack;
- wherein the right shoulder strap is coupled to the backpack at the top right rear of the backpack and at the bottom right rear of the backpack.

8. The backpack with inflatable cushions according to claim 7
- wherein the backpack comprises one or more exterior storage pockets.

9. The backpack with inflatable cushions according to claim 7
- wherein the backpack comprises a hanger loop;
- wherein the hanger loop is adapted to suspend the backpack from a hook when the backpack is not being worn.

10. The backpack with inflatable cushions according to claim 7
- wherein the inflatable shoulder pads are adapted to cushion the user's shoulders by distributing the weight of the backpack over an expanded area when the inflatable shoulder pads are inflated;
- wherein an individual inflatable shoulder pad selected from the inflatable shoulder pads surrounds the upper end of an individual shoulder strap selected from the pair of shoulder straps.

11. The backpack with inflatable cushions according to claim 10
- wherein the shoulder air bladder surrounds the individual inflatable shoulder pad;
- wherein the shoulder air bladder expands when inflated thus distributing the weight of the backpack over an enlarged footprint;
- wherein the shoulder air bladder is adapted to act as a shock-absorber by dampening kinetic impulses as a user moves while wearing the backpack;
- wherein the flexible covering surrounds the shoulder air bladder to protect the shoulder air bladder from damage.

12. The backpack with inflatable cushions according to claim 11
- wherein the shoulder air pump inflates and deflates the shoulder air bladder;
- wherein the shoulder air pump is adapted to pump air into the shoulder air bladder when the user performs an inflation action to the shoulder air pump;
- wherein the shoulder air pump is adapted to release air from the shoulder air bladder when the user performs a deflation action to the shoulder air pump.

13. The backpack with inflatable cushions according to claim 12
- wherein the individual inflatable shoulder pad comprises one or more exterior foam pads;
- wherein the one or more exterior foam pads are coupled to an inside surface of the individual inflatable shoulder pad;
- wherein the one or more exterior foam pads are adapted to increase comfort by providing additional cushioning and to enhance the appearance of the backpack with inflatable cushions.

14. The backpack with inflatable cushions according to claim 13
- wherein the inflatable lumbar support comprises an open cell foam pad, a lumbar air bladder, and a lumbar air pump;
- wherein the open cell foam pad is a cushioning pad that extends laterally across the bottom rear of the backpack;
- wherein the open cell foam liner distributes the weight of the backpack over the footprint of the open cell foam pad;
- wherein the lumbar air bladder surrounds the open cell foam pad;
- wherein the lumbar air bladder expands when inflated thus distributing the weight of the backpack over an enlarged footprint;
- wherein the lumbar air bladder is adapted to act as a shock-absorber by dampening kinetic impulses as the user moves while wearing the backpack.

15. The backpack with inflatable cushions according to claim 14
- wherein the lumbar air pump inflates and deflates the lumbar air bladder;
- wherein the lumbar air pump is adapted to pump air into the lumbar air bladder when the user performs the inflation action to the lumbar air pump;
- wherein the lumbar air pump is adapted to release air from the lumbar air bladder when the user performs the deflation action to the lumbar air pump.

16. The backpack with inflatable cushions according to claim 15
- wherein the backpack comprises a lumbar support pouch to hold the open cell foam pad and the lumbar air bladder;
- wherein the lumbar support pouch is a rearward extension of the bottom rear of the backpack that is adapted to place the lumbar air bladder closer to the user's lower back.

17. The backpack with inflatable cushions according to claim 15
- wherein an individual air pump selected from the shoulder air pumps and the lumbar air pump are associated with an individual air bladder selected from the shoulder air bladders and the lumbar air bladder by virtue of the fact that the individual air pump inflates and/or deflates the individual air bladder;

wherein the individual air pump is adapted to inflate the individual air bladder when the user performs the inflation action;

wherein the individual air pump is adapted to deflate the individual air bladder when the user performs the deflation action;

wherein the inflation action comprises repeatedly pressing a pump activator of the individual air pump;

wherein the deflation action comprises pressing and holding the pump activator of the individual air pump or twisting the pump activator of the individual air pump.

18. The backpack with inflatable cushions according to claim 17 wherein an interior compartment of the backpack is accessible via one of the zippered openings;

wherein the interior compartment includes a laptop sleeve;

wherein the laptop sleeve is provided to support and store a laptop computer inside of the backpack.

19. The backpack with inflatable cushions according to claim 18 wherein the interior compartment of the backpack houses a charging module compartment;

wherein the charging module compartment houses a charging pad therein;

wherein the charging module compartment provides a wire opening to enable egress of a wire to extend from the laptop computer to the charging pad in order to recharge the laptop computer while inside of the backpack.

* * * * *